United States Patent
Chen et al.

(10) Patent No.: US 9,495,147 B2
(45) Date of Patent: Nov. 15, 2016

(54) METHOD AND APPARATUS FOR OBTAINING CONTEXT INFORMATION FOR A SOFTWARE DEVELOPMENT TASK

(71) Applicant: International Business Machines Corporation, Armonk, NY (US)

(72) Inventors: Zhang Hong Chen, Beijing (CN); Fa Hua Jin, Beijing (CN); Xin Peng Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/740,349

(22) Filed: Jun. 16, 2015

(65) Prior Publication Data
US 2016/0041825 A1    Feb. 11, 2016

(30) Foreign Application Priority Data
Aug. 8, 2014    (CN) .......................... 2014 1 0387768

(51) Int. Cl.
*G06F 9/44*    (2006.01)
*G06F 11/36*    (2006.01)

(52) U.S. Cl.
CPC *G06F 8/70* (2013.01); *G06F 11/36* (2013.01)

(58) Field of Classification Search
CPC .............. G06F 8/75; G06F 8/20; G06F 8/70; G06F 11/36
USPC ................. 717/107–109, 120–121, 161–163
See application file for complete search history.

(56) References Cited

U.S. PATENT DOCUMENTS

| | | | |
|---|---|---|---|
| 5,822,593 A * | 10/1998 | Lamping | G06F 9/44 717/144 |
| 6,093,215 A * | 7/2000 | Buxton | G06F 8/61 717/104 |
| 6,327,703 B1 * | 12/2001 | O'Donnell | G06F 9/44521 717/162 |
| 6,523,027 B1 * | 2/2003 | Underwood | G06F 9/465 |
| 6,662,357 B1 * | 12/2003 | Bowman-Amuah | G06F 8/20 717/120 |
| 6,742,175 B1 * | 5/2004 | Brassard | G06F 8/71 717/107 |
| 7,263,695 B1 * | 8/2007 | Muzaffar | G06F 8/71 717/162 |
| 7,392,509 B2 * | 6/2008 | Sinha | G06F 11/3684 714/E11.207 |
| 7,721,250 B2 | 5/2010 | Anand et al. | |

(Continued)

FOREIGN PATENT DOCUMENTS

GB    2457552 A    8/2009

OTHER PUBLICATIONS

Hamlet, "Tools and Experiments Supporting a Testing-Based Theory of Component Composition", ACMTransactions on Software Engineering andMethodology,vol. 18,No. 3, Article 12, pp. 1-41, 2009.*

(Continued)

*Primary Examiner* — Anil Khatri
(74) *Attorney, Agent, or Firm* — Cantor Colburn LLP; Maeve Carpenter (57) ABSTRACT

Aspects are directed to obtaining context information for a software development task. A method includes finding, in response to designating any one tool component associated with the software development task as a root component, at least one other tool component having an at least one-level link with the root component. Context information is extracted n from the root component and the at least one other tool component. A context set is generated based on the extracted context information.

15 Claims, 7 Drawing Sheets

(56) References Cited

U.S. PATENT DOCUMENTS

| | | | |
|---|---|---|---|
| 7,734,685 B2 | 6/2010 | Cheng et al. | |
| 7,827,527 B1* | 11/2010 | Chiluvuri | G06F 8/30 717/104 |
| 8,245,194 B2* | 8/2012 | Atkin | G06F 11/3688 717/106 |
| 8,370,798 B2* | 2/2013 | Broadfoot | G06F 8/10 717/107 |
| 8,418,131 B2* | 4/2013 | Emmelmann | G06F 8/315 709/217 |
| 8,510,726 B2* | 8/2013 | Eisen | G06F 8/51 717/162 |
| 8,527,943 B1* | 9/2013 | Chiluvuri | G06F 8/30 717/106 |
| 8,589,880 B2* | 11/2013 | Jones | G06F 8/20 717/122 |
| 8,595,703 B2* | 11/2013 | van Gogh | G06F 11/3604 714/38.1 |
| 8,645,905 B2 | 2/2014 | Halbedel | |
| 8,856,733 B2* | 10/2014 | Lovisa | G06F 8/36 717/107 |
| 9,330,193 B1* | 5/2016 | Yadav | G06F 17/30893 |
| 2007/0130561 A1 | 6/2007 | Siddaramappa et al. | |
| 2010/0313179 A1 | 12/2010 | Groves et al. | |
| 2010/0325540 A1 | 12/2010 | Biazetti et al. | |
| 2013/0227517 A1 | 8/2013 | Fox et al. | |

OTHER PUBLICATIONS

Antunes et al, "Context Capture in Software Development", ACM, sdic.dei.uc.pt/home/wp-content/uploads/.../SDiC-2010-AIAI-AISEW.pdf, pp. 1-10, 2010.*

Wimalasuriya et al, "Components for Information Extraction: Ontology-Based Information Extractors and Generic Platforms" ACM, pp. 9-18, 2010.*

Bouchet et al, "ICARE: A Component-Based Approach for the Design and Development of Multimodal Interfaces" ACM, pp. 1325-1328, 2004.*

Yoon et al, "Towards Incremental Component Compatibility Testing", ACM, pp. 119-128, 2011.*

Grassi et al, "Towards Automatic Compositional Performance Analysis of Component-based Systems", ACM, pp. 59-63, 2004.*

Srinivas et al, "Clustering Software Project Components for Strategic Decisions and Building Reuse Libraries", ACM, pp. 1-5, 2015.*

Kieburtz et al, "A Software Engineering Experiment in Software Component Generation", IEEE, pp. 542-552, 1996.*

Kruger et al., "Automated Retrieval of Aritfacts Created during the Software Development Life-cycle", Technical Report CS08-02-00, Data Network Architecturs Group, 9 pages.

Oracle Corporation, "Oracle Team Productivity Center Overview" An Oracle White Paper, Sep. 2011, 23 pages.

Kersten et al. "Using Task Context to Improve Programmer Productivity", SIGSOFT 06/FSE 14, Nov. 2006; 11 pages.

* cited by examiner

METHOD AND APPARATUS FOR OBTAINING CONTEXT INFORMATION FOR A SOFTWARE DEVELOPMENT TASK

FOREIGN PRIORITY

This application claims priority to Chinese Patent Application No. 201410387768.9, filed 8 Aug. 2014, and all the benefits accruing therefrom under 35 U.S.C. §119, the contents of which in its entirety are herein incorporated by reference.

BACKGROUND

The present invention relates to software development technology, and more particularly, to obtaining context information for a software development task.

Lifecycle of software development may include phases such as requirement analysis, design, coding, testing, releasing, maintenance and the like. In the requirement analysis phase, various requirements and functions of a software development task may be obtained and confirmed. In the design phase, design concepts and technical points of the software development task may be determined. In the coding phase, a design result in the design phase is converted into computer executable program code. In the testing phase, the software is tested so that any problems can be found and corrected. Therefore, context information associated with the software development task is generated in each phase.

Furthermore, in the entire process of software development, relevant software developers also conduct various discussions. A lot of useful context information associated with the software development task may be generated in such discussions.

Such information associated with the software development task may exist in a plurality of tools for software development, as the context information. These tools, for example, include a requirement tool, a design tool, a testing tool, a task tracking tool, and the like. Each tool may include one or more tool components. Each tool component carries the specific context information associated with a certain software development task. The tool components of the requirement tool contain the context information describing the requirements. The tool components of the design tool contain the context information describing the design of how to realize the requirement. The tool components of the testing tool contain the context information describing the test cases verifying whether the requirements are met. The tool components of the task tracking tool contain the context information generated from the discussions of the software developers, which may taken as comments on other tool component.

SUMMARY

Embodiments of the present invention provide a method, system and computer program product for obtaining context information for a software development task. A method includes finding, in response to designating any one tool component associated with the software development task as a root component, at least one other tool component having an at least one-level link with the root component. Context information is extracted in from the root component and the at least one other tool component. A context set is generated based on the extracted context information.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

When software developers write code using a coding tool, they usually refer to the context information to assist in the coding. In contemporary systems, when writing code, the software developers go to each tool providing the context information to find the required context information, and utilize the context information to assist in writing the code. However, with such a method, it takes a longer time to find the useful context information, resulting in inefficiency of the program development.

For example, when writing program code on account processing, the software developer obtains, by searching each tool, the requirement "a rule for becoming a VIP account: balance>=1,000,000" from the requirement tool, obtains the comment "use CommonService.checkBalance( ) to get a balance" from the task tracking tool, then writes the above requirement into the program code, and writes the statement "CommonService.checkBalance (account)>1000000".

Furthermore, a link may be created between the tool components to reflect the relationship between the tool components. The tool components may be linked using a tool such as Open Service for Lifecycle Collaboration (OSLC). Such a link may be a link based on a uniform resource locator (URL) or other proprietary link. A plurality of tool components may create the context for a software development task by means of the links between the tool components.

Figure 2:
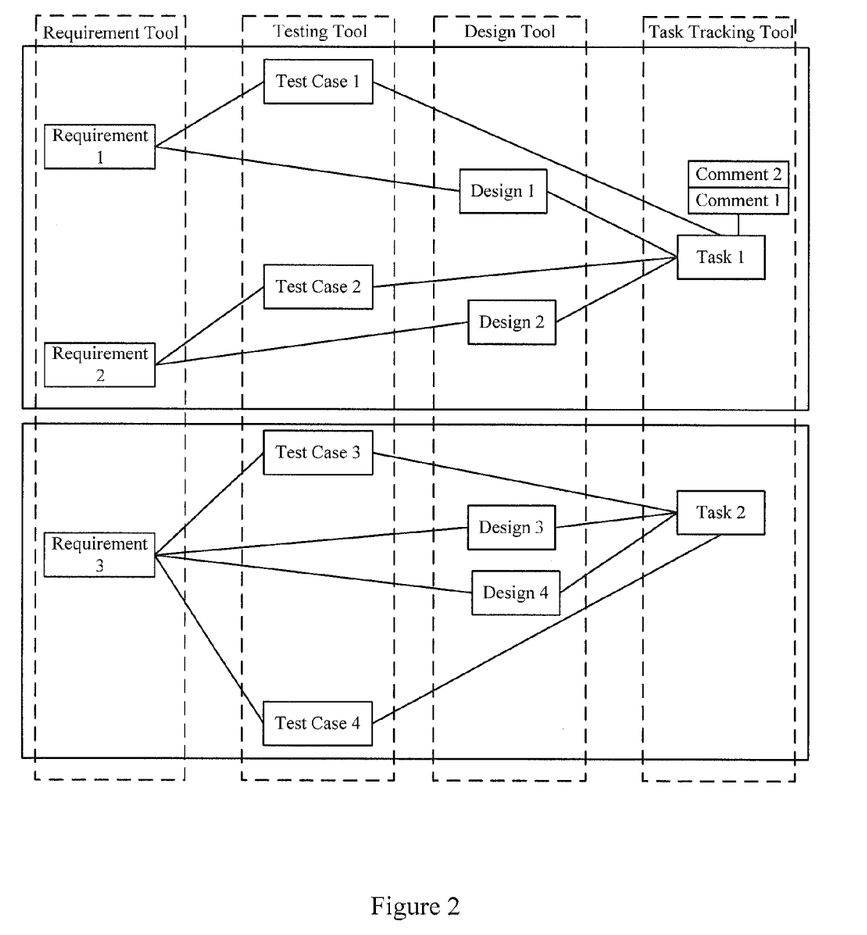
FIG. 2 shows a schematic diagram of an example for illustrating the links between the tools.

FIG. 2 shows a schematic diagram of an example for illustrating the links between the tools. As shown in FIG. 2, each tool component may be linked to one or more other tool components. Taking the component Requirement 1 for example, it can be seen that links are created between the component Requirement 1 and the component Test Case 1, and the component Design 1. Furthermore, links are also created between the component Task 1 and the components Design 1, Design 2, Test Case 1, and Test Case 2. Comment 1 and Comment 2 on the component Task 1 are further contained in the task tracking tool. According to FIG. 2, the tool components for creating the context of Task 1 and Task 2 may be obtained, as indicated by solid-line blocks in FIG. 2.

Thus, when the software developer needs to find the context information to assist in the coding, he may traverse the whole context by clicking the links between the tool components in different tools, and obtain the useful context information from the tool components for use in the coding tool. Although this method can shorten the time required to find the context information to some extent, the context information still needs to be obtained by going to the corresponding tool component.

According to an embodiment of the present invention, there is provided a method for obtaining context information for a software development task, which includes: finding, in response to designating any one tool component associated with the software development task as a root component, at least one other tool component having an at least one-level link with the root component; extracting respective context information from the root component and the at least one other tool component; and generating a context set based on the extracted context information.

Embodiments can aggregate the context information for the software development task in advance for use by the software development when writing code, without the software developer obtaining the useful context information by going to each tool component, thereby improving the efficiency of program development.

Some embodiments will be described in more detail with reference to the accompanying drawings, in which embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
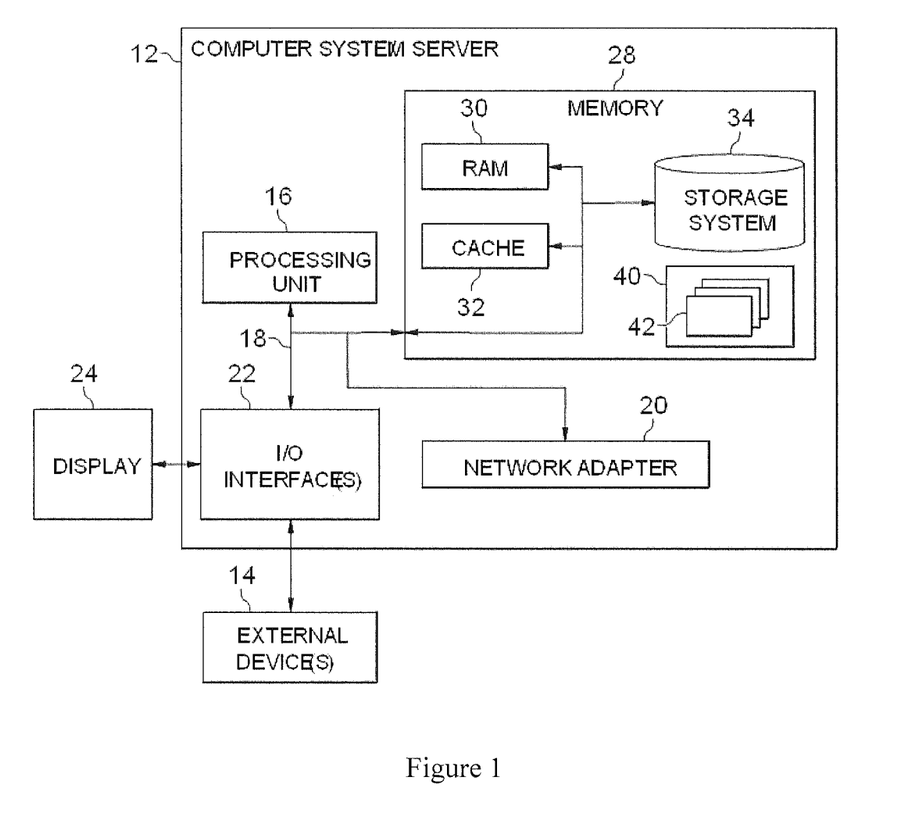
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
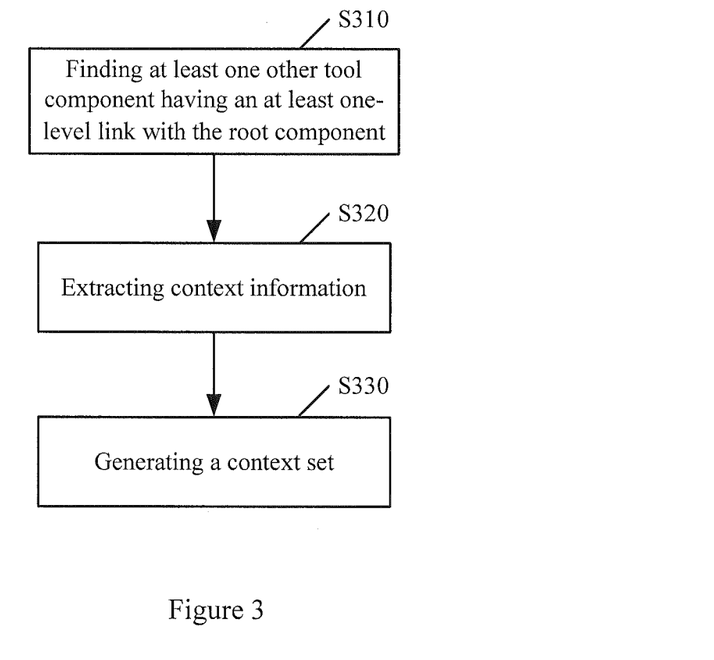
FIG. 3 shows a flowchart of the method for obtaining context information for a software development task according to an embodiment of the present invention.

FIG. 3 shows a flowchart of the method for obtaining context information for a software development task according to an embodiment of the present invention. The embodiment will be described in detail below with reference to the accompanying drawing.

The idea of the embodiment is to utilize links between the tool components containing the context information for the software development task to obtain the context information for reference by the software developer when coding.

As shown in FIG. 3, in block S301, in response to designating any one tool component associated with the software development task as a root component, at least one other tool component having at least one level of link with the root component is found.

As described above, the relationship between the tool components may be established by means of the links between the tool components. Each tool component may have a link(s) to one or more other tool components. If the tool component may be linked to other tool component directly, it is considered that the tool component has a one-level link with the other tool component. If the tool component may be linked to another tool component via one or more other tool components, it is considered that the tool component has a multi-level link with another tool component. That is, if the tool component may be linked to another tool component via N (N is an integer) tool component(s), it is considered that the tool component has an (N+1)-level link with another tool component. In the example of FIG. 2, it can be seen that the component Requirement 1 has one-level links with the components Test Case 1 and Design 1; component Requirement 1 has a two-level link with the component Task 1; component Requirement 1 has three-level links with components Design 2 and Test Case 2; and component Requirement 1 has a four-level link with component Requirement 2.

In an embodiment, the root component is the initially determined tool component associated with the software development task. The root component may be arbitrarily designated by the software developer according to the software development task, or automatically identified from various tools according to a keyword of the software development task. After the root component is designated, other tool component having the link therewith may be found. Thus, the root component may be used to create the context of the software development task together with the found other tool component.

In an embodiment, all other tool components each of which has an at least one-level link with the root component may be found. In the example of FIG. 2, it is assumed that the component Requirement 1 is designated as the root component, and the tool components each of which has the at least one-level link with the component Requirement 1 include components Test Case 1, Design 1, Task 1, Design 2, Test Case 2, and Requirement 2.

In another embodiment, at last one other tool component may be found, so that the number of levels of the link between other tool component and the root component does not exceed a predetermined threshold, in order to shorten the time for searching and avoid the excessive levels of the link. For example, it is assumed that the predetermined threshold is 3 levels, and other tool component between which and the root component the number of levels of the link does not exceed 3 levels can be found. In the example of FIG. 2, if the component Requirement 1 is designated as the root component, the tool components having the links with the number of levels not exceeding 3 levels include: the component Test Case 1, the component Design 1, the component Task 1, the component Design 2 and the component Test Case 2.

Then in block S320, context information is extracted from the root component and the found at least one other tool component. In the embodiment, text information in a tool component may be used as the context information. The text information, for example, may be component content description, image description, or the like. Of course, it is easily appreciated for those skilled in the art that other types of data may also be used as the context information.

Then in block S330, a context set is generated based on the extracted context information. The generated context set is used for providing the context information of the software development task for reference by the software developer when writing code.

In an embodiment, a context entry is first established for each piece of the extracted context information. The context entry may include the corresponding context information. Then an index is created for the established context entry. In one embodiment, an identification of the tool component from which the corresponding context information is extracted may be used as the index of the context entry. The identification of the tool component may be a name, a serial number, or the like, of the tool component. Although the identification of the tool component is used as the index in this embodiment, it will be appreciated for those skilled in the art that other forms of index may also be used. Then the context set is generated based on the established context entry and the index thereof, and an identifier is assigned to the generated context set for distinguishing from other context sets. For example, the generated context set may be shown as follows:

Context Set 1

| Identification of tool component | Context information |
|---|---|
| Requirement 1 | A rule for becoming a VIP account: balance >= 1,000,000 |
| Comment 1 | Use CommonService.checkBalance( ) to get a balance |
| Comment 2 | How to get a balance? |

Then each index of the context entry in the context set is associated with the identifier of the context set. For example, an association table may be established, in which the identifier of the context set and the identification of the associated tool component are recorded correspondingly.

Furthermore, the context entry may further include a link address to the tool component from which the corresponding context information is extracted. In this case, the above Context Set 1 may be shown as follows:

Context Set 1

| Identification of tool component | Context information | Link address |
|---|---|---|
| Requirement 1 | A rule for becoming a VIP account: balance >= 1,000,000 | http://host/req/req1 |
| Comment 1 | Use CommonService.checkBalance( ) to get a balance | http://host/rtc/workitem/comment2 |
| Comment 2 | How to get a balance? | http://host/rtc/workitem/comment1 |

The generated context set may be stored in a cotext database, so that the software developer can search it when writing code.

It can be seen from the above description that the method for obtaining context information for a software development task of the embodiment can aggregate the context information for the software development task in advance by utilizing the links between the tool components to obtain the tool component associated with the software development task and thus obtain the context information, so that the software developer can use it in the code writing, without going to each tool component to find the context information.

Figure 4:
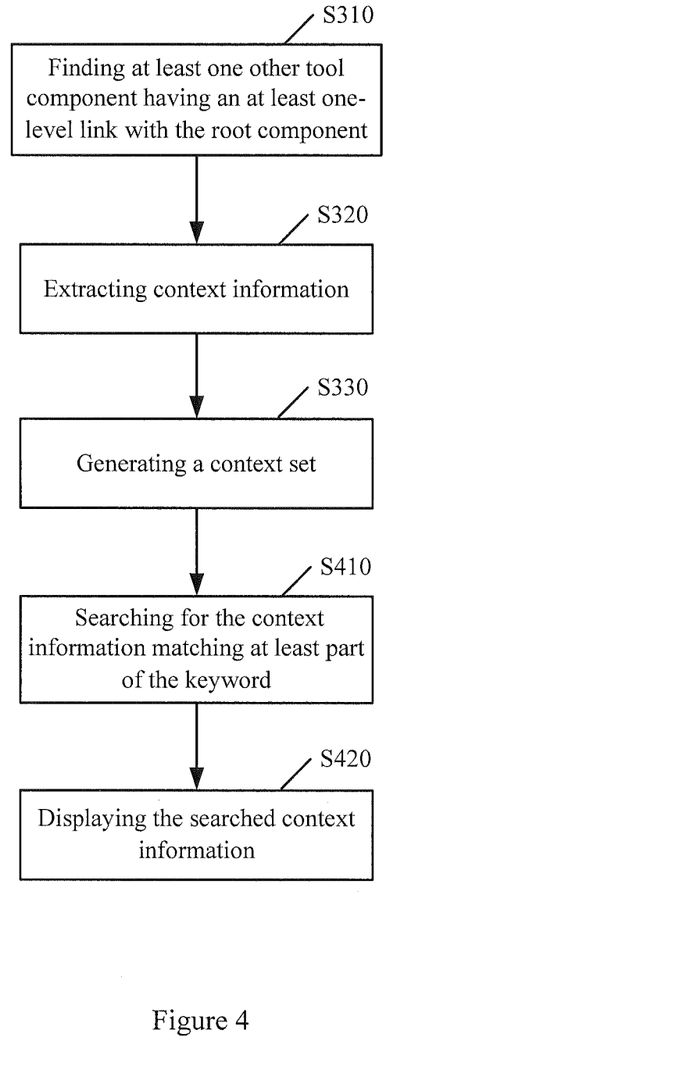
FIG. 4 shows a flowchart of a method for obtaining context information for a software development task according to an embodiment of the present invention.

FIG. 4 shows a flowchart of the method for obtaining context information for a software development task according to another embodiment of the present invention. The embodiment will be described in detail below with reference to the accompanying drawing. Same reference numerals are used for same parts as the previous embodiment, and descriptions thereof will be omitted properly.

After the context set for the software development task is obtained through the above blocks S310, S320 and S330, when the software developer is coding, in block S410, the context set is searched for the context information matching at least part of a received keyword, in response to the at least part of the keyword. The searching of the context information may be performed using any one of the search methods known in the art, such as a keyword matching method.

Then in block S420, the searched context information is displayed. Thus, the software developer can obtain the context information associated with the input keyword for assisting in code writing.

In an embodiment, after the context information is searched, each piece of the searched context information itself may be directly displayed. Such display is suitable for the case of the less context information.

In another embodiment, after the context information is searched, first an index of an context entry containing the searched context information is displayed. In the case that the identification of the tool component is used as the index, the identification of the tool component corresponding to the searched context information is displayed. Then, in response to an operation on the displayed index of the context entry, the corresponding context information is displayed. The operation on the index may include an operation such as double clicking the index, pressing enter after the index is selected, or the like.

Furthermore, the link address to the tool component corresponding to the context information may also be displayed in addition to the context information.

It can be seen from the above description that methods for obtaining context information for a software development task of the embodiment can further display all the required context information when the software developer writes code, without the software developer going to each tool component to obtain the useful context information.

Figure 5:
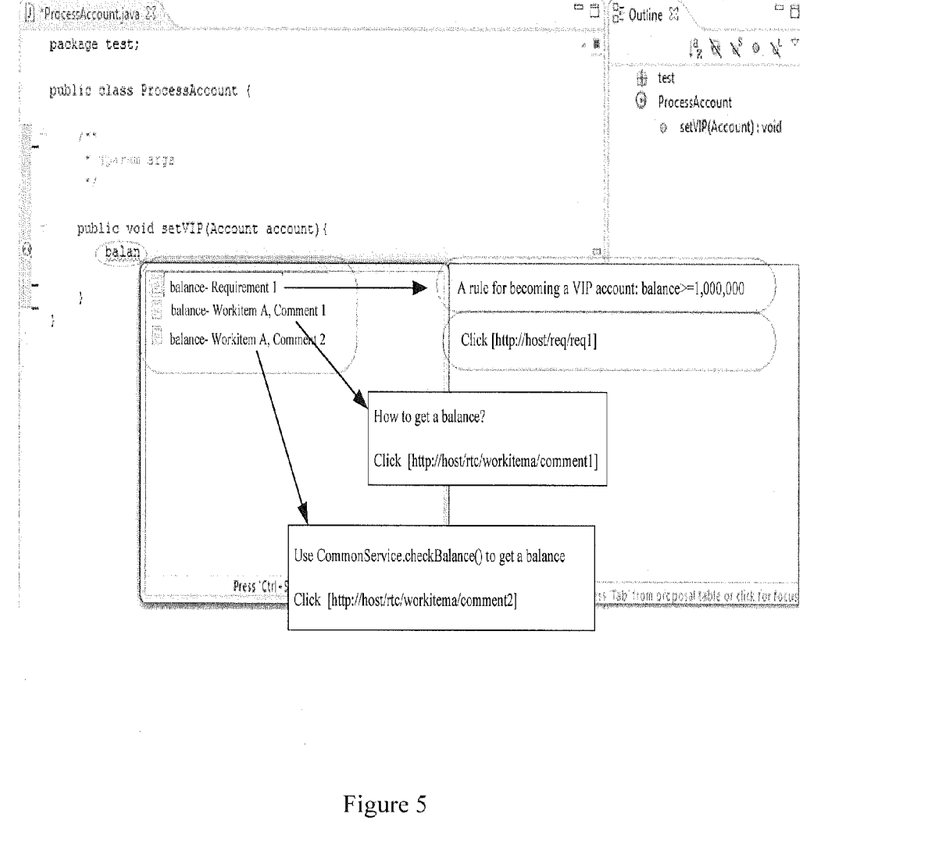
FIG. 5 shows a schematic diagram of an example illustrating the use of the context information for coding by employing a method of an embodiment of the present invention.

FIG. 5 shows a schematic diagram of an example illustrating the use of the context information for coding by employing method a of an embodiment of the invention. As shown in FIG. 5, during the code writing, when a keyword "balan" is input, the identifications "balance-Requirement 1", "balance-Workitem A, Comment 1", "balance-Workitem A, Comment 2" of all the tool components associated with the "balance" are displayed in a window. Then the "balance-Requirement 1" is double clicked, and the context information "a rule for becoming a VIP account: balance>=1,000,000" of the context entry indexed by the "Requirement 1" may be displayed. Furthermore, the link address to the tool component "Requirement 1" may be further displayed for clicking by the software developer. Similarly, when the "balance-Workitem A, Comment 1" is double clicked, the context information "how to get a balance" of the context entry indexed by the "Comment 1" and the link address to the tool component "Comment 1" may be displayed. When the "balance-Workitem A, Comment 2" is double clicked, the context information "use CommonService.checkBalance( )to get a balance" of the context entry indexed by the "Comment 2" and the link address to the tool component "Comment 2" may be displayed.

Figure 6:
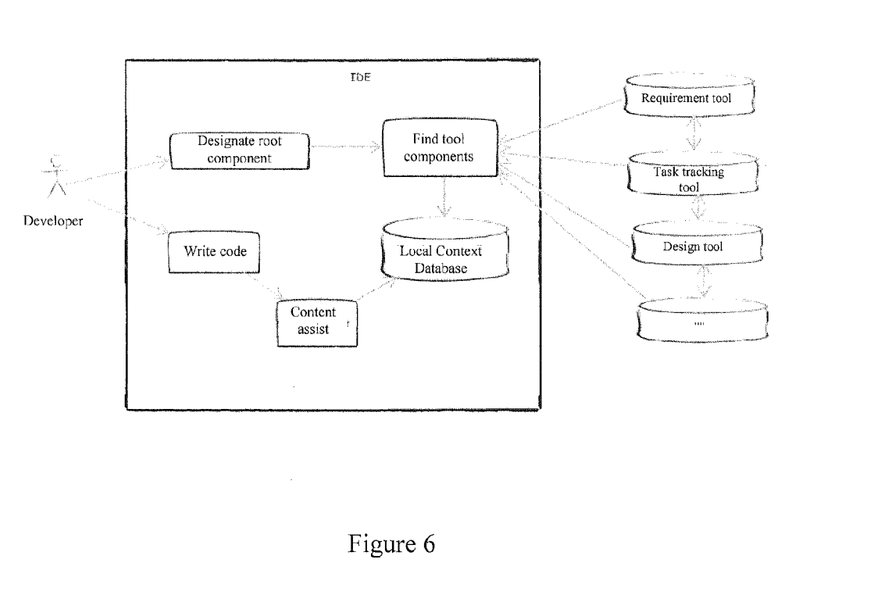
FIG. 6 shows a schematic diagram of integrated development environment (IDE) in which a method of an embodiment of the present invention is implemented.

FIG. 6 shows a schematic diagram of an integrated development environment (IDE) in which the method of the embodiments of the invention can be implemented. As shown in FIG. 6, when the root component of the software development task is designated by the software developer, the designation of the root component is received in the IDE. Then, the tool components having the links with the root component can be found from the software development tools such as the requirement tool, the task tracking tool, the design tool and the like, and the context information is extracted therefrom. The extracted context information is stored in the form of a set in a local context database, for use in the subsequent coding. When the software developer begins to write code, a content assist tool can be used to find the required context set in the local context database based on the designated tool component and search for the context information matching an input keyword, and then the searched context information is displayed for the software developer.

Although the case in which the method of the embodiments is implemented in the IDE is merely illustrated, it should be understood for those skilled in the art that the method of the embodiments of the invention is also suitable for other program development environments.

Figure 7:
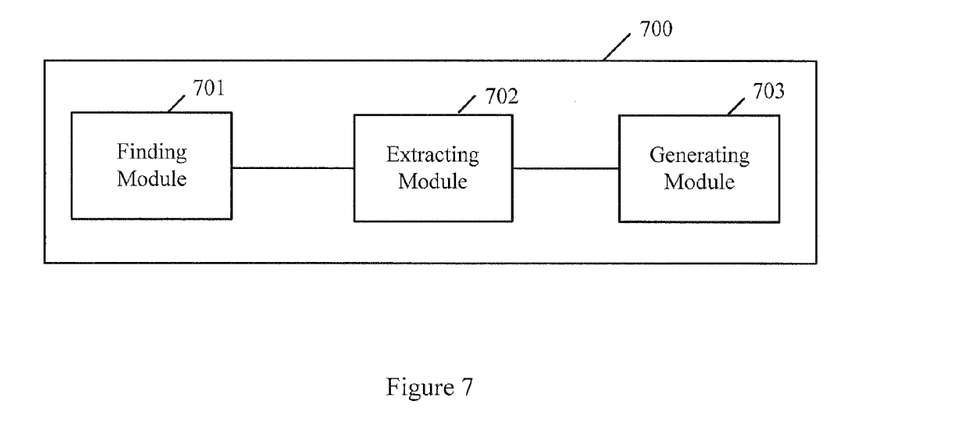
FIG. 7 shows a schematic block diagram of an apparatus for obtaining context information for a software development task according to an embodiment of the present invention.

FIG. 7 shows a schematic block diagram of an apparatus 700 for obtaining context information for a software development task according to an embodiment of the present invention. The embodiment will be described in detail below with reference to the accompanying drawing. The descriptions for the same parts as the previous embodiments are omitted properly.

The apparatus 700 of the embodiment can comprise a finding module 701 which is configured to find, in response to designating any one tool component associated with the software development task as a root component, at least one other tool component having an at least one-level link with the root component, an extracting module 702 which is configured to extract context information from the root component and the at least one other tool component, and a generating module 703 which is configured to generate a context set based on the extracted context information.

In an embodiment, the finding module 701 may find all other tool components each of which has the at least one-level link with the root component.

In another embodiment, the finding module 701 may find any other tool component, the number of levels of the link between which and the root component does not exceed a predetermined threshold.

After the finding module 701 finds other tool components having the link with the root component, the extracting module 702 extracts the text information from the root component and the other tool components having the link therewith as the context information. Then the generating module 703 generates the context set based on the extracted information.

In the generating module 703, an establishing unit establishes a context entry for each piece of the extracted context information, wherein the established context entry includes the corresponding context information. Then an index creating unit creates an index for the established context entry. In an embodiment, the identification of the tool component from which the corresponding context information is extracted may be used as the index of the context entry. Then a generating unit generates the context set based on the context entry and the index. An assigning unit assigns an identifier to the context set for distinguishing from other context sets. Then an associating unit associates the index of the context entry in the context set with the identifier of the context set.

Further, the context entry may further include a link address to the tool component from which the corresponding context information is extracted.

It should be noted that the apparatus 700 of the embodiment can operationally implement the method for providing context information for a software development task of the embodiment shown in FIG. 3.

Figure 8:
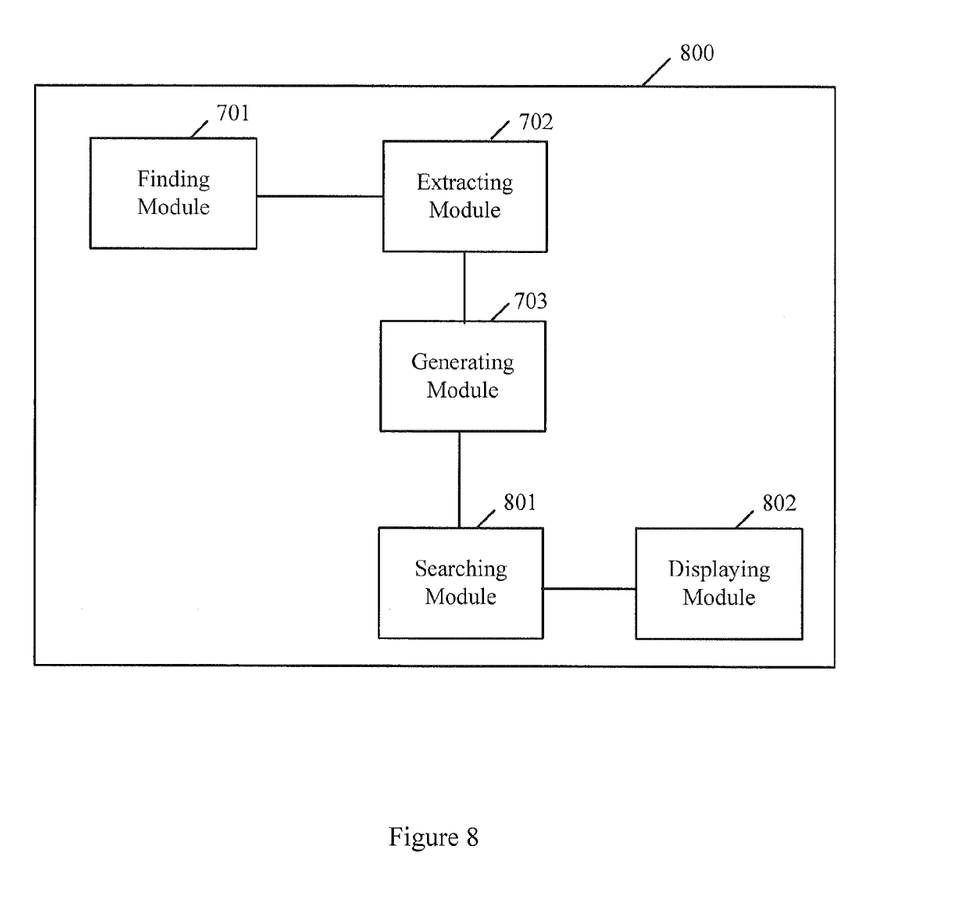
FIG. 8 shows a schematic block diagram of an apparatus for obtaining context information for a software development task according to an embodiment of the present invention.

FIG. 8 shows a schematic block diagram of the apparatus 800 for obtaining context information for a software development task according to an embodiment of the present invention. The embodiment will be described in detail below with reference to the accompanying drawing. The same reference numerals will be used for the same parts as the previous embodiments, and the descriptions thereof are omitted properly.

In addition to the finding module 701, the extracting module 702 and the generating module 703 described above, the apparatus 800 of the embodiment may further comprise a searching module 801 which is configured to search, in response to at least part of a received keyword, the context set for the context information matching the at least part of the keyword and a displaying module 802 which is configured to display the searched context information.

When the software developer is writing the codes, the searching module 801 may search the context set generated by the generating module 703 for the matching context information according to the part of the received keyword using any one of the search methods known in the art.

The searched context information may be displayed by the displaying module 802. In one embodiment, the displaying module 802 may directly display each piece of the searched context information itself. In another embodiment, the displaying module 802 may firstly display the index of the context entry containing the searched context information, and display the corresponding context information in response to an operation on the index of the context entry. Further, the displaying module 802 may further display the link address to the corresponding tool component.

It should be noted that the apparatus 800 of the embodiment can operationally implement the method for obtaining context information for a software development task of the embodiment shown in FIG. 4.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for obtaining context information for a software development task, the method comprising:
    finding, by a processor, in response to designating any one tool component associated with the software development task as a root component, at least one other tool component having an at least one-level link with the root component;
    extracting, by the processor, context information from the root component and the at least one other tool component; and
    generating, by the processor, a context set based on the extracted context information, the generating comprising:
    establishing a context entry for each piece of the extracted context information, wherein the context entry comprises the corresponding context information;
    creating an index for the context entry;
    generating a context set based on the context entry and the index;
    assigning an identifier to the context set; and
    associating the indexes of the context entries in the context set with the identifier of the context set, and
    outputting the context set to a user; and
    finding other tool components where the number of levels of the link between which and the root component does not exceed a predetermined threshold.

2. The method of claim 1, wherein finding at least one other tool component having an at least one-level link with the root component comprises:
    finding all other tool components, each of which has an at least one-level link with the root component.

3. The method of claim 1, wherein extracting context information from the root component and the at least one other tool component comprises:
    extracting text information from the root component and the at least one other tool component as the context information.

4. The method of claim 1, wherein the context entry comprises a link address to the tool component from which the corresponding context information is extracted.

5. The method of claim 1, further comprising:
    searching, in response to at least part of a received keyword, the context set for the context information matching the at least part of the keyword; and
    displaying the searched context information.

6. The method of claim 5, wherein displaying the searched context information comprises:
    displaying the index of the context entry containing the searched context information; and
    displaying the corresponding context information in response to an operation on the index of the context entry.

7. The method of claim 6, wherein displaying the searched context information further comprises:
    displaying the link address to the corresponding tool component.

8. A system for obtaining context information for a software development task, the system comprising:
    a memory having computer readable instructions; and
    one or more processors for executing the computer readable instructions, the computer readable instructions comprising:
    finding, in response to designating any one tool component associated with the software development task as a root component, at least one other tool component having an at least one-level link with the root component;
    extracting context information from the root component and the at least one other tool component; and generating a context set based on the extracted context information, the generating comprising:

establishing a context entry for each piece of the extracted context information, wherein the context entry comprises the corresponding context information;

creating an index for the context entry;

generating a context set based on the context entry and the index;

assigning an identifier to the context set; and associating the indexes of the context entries in the context set with the identifier of the context set, and outputting the context set to a user; and finding other tool components where the number of levels of the link between which and the root component does not exceed a predetermined threshold.

9. The system of claim 8, wherein finding at least one other tool component having an at least one-level link with the root component comprises:

finding all other tool components, each of which has an at least one-level link with the root component.

10. The system of claim 8, wherein extracting context information from the root component and the at least one other tool component comprises:

extracting text information from the root component and the at least one other tool component as the context information.

11. The system of claim 8, wherein the context entry comprises a link address to the tool component from which the corresponding context information is extracted.

12. The system of claim 8, wherein the computer readable instructions further comprise:

searching, in response to at least part of a received keyword, the context set for the context information matching the at least part of the keyword; and displaying the searched context information.

13. The system of claim 12, wherein displaying the searched context information comprises:

displaying the index of the context entry containing the searched context information; and displaying the corresponding context information in response to an operation on the index of the context entry.

14. The system of claim 13, wherein displaying the searched context information further comprises:

displaying the link address to the corresponding tool component.

15. A computer program product for obtaining context information for a software development task, the computer program product comprising a non-transitory computer readable storage medium having program instructions embodied therewith, the program instructions executable by a processor to cause the processor to perform:

finding, in response to designating any one tool component associated with the software development task as a root component, at least one other tool component having an at least one-level link with the root component;

extracting context information from the root component and the at least one other tool component; and generating a context set based on the extracted context information, the generating comprising:

establishing a context entry for each piece of the extracted context information, wherein the context entry comprises the corresponding context information;

creating an index for the context entry;

generating a context set based on the context entry and the index;

assigning an identifier to the context set; and associating the indexes of the context entries in the context set with the identifier of the context set, and outputting the context set to a user; and finding all other tool components, each of which has an at least one-level link with the root component.

* * * * *